United States Patent [19]
Ogawa et al.

[11] Patent Number: 5,641,045
[45] Date of Patent: Jun. 24, 1997

[54] SYNCHRONIZER FOR TRANSMISSION

[75] Inventors: Shinji Ogawa; Masayuki Kii; Tomoyuki Kanou, all of Toyota, Japan

[73] Assignee: Toyota Jidosha Kabushiki Kaisha, Toyota, Japan

[21] Appl. No.: 457,589

[22] Filed: Jun. 1, 1995

[30] Foreign Application Priority Data

Aug. 26, 1994 [JP] Japan ................................. 6-225969

[51] Int. Cl.⁶ ............................ F16D 23/06; F16H 57/12
[52] U.S. Cl. .................. 192/53.341; 74/339; 192/104 R
[58] Field of Search .................. 192/53.341, 53.343, 192/104 R, 103 R, 53.34, 53.342, 53.3, 103 C; 74/339

[56] References Cited

U.S. PATENT DOCUMENTS

| | | |
|---|---|---|
| 1,931,288 | 10/1933 | Griswold . |
| 2,221,899 | 11/1940 | White et al. .................... 192/53.341 X |
| 2,311,740 | 2/1943 | Dodge ........................ 74/339 |
| 2,333,165 | 11/1943 | Fishburn . |
| 2,377,206 | 5/1945 | Butzbach ............... 192/53.341 |
| 4,712,662 | 12/1987 | Elverdam ............... 192/53.341 |
| 5,135,087 | 8/1992 | Frost ................... 192/53.341 |

FOREIGN PATENT DOCUMENTS

| | | |
|---|---|---|
| 0157908 | 10/1985 | European Pat. Off. . |
| 1058792 | 11/1953 | France . |
| 1077989 | 11/1958 | Germany . |
| 60-46337 | 4/1985 | Japan . |
| 2142390 | 1/1985 | United Kingdom . |

*Primary Examiner*—Charles A. Marmor
*Assistant Examiner*—Saul J. Rodriguez
*Attorney, Agent, or Firm*—Oblon, Spivak, McClelland, Maier & Neustadt, P.C.

[57] ABSTRACT

Balls to be moved radially outward by a centrifugal force are held in a clutch hub, and projections extending around the outer circumferences of the balls are united with a synchronizer ring. Those portions of the projections, which radially confront the balls, are formed with slopes for establishing an axial force to push the synchronizer ring away from the spline piece on the basis of the centrifugal force of the balls. Thus, the axial force for disengaging the synchronizer ring from a rotating member to be synchronized can be increased to prevent the chatter at a low number of revolution and to effectively eliminate the drag torque at a high number of revolution.

11 Claims, 5 Drawing Sheets

SYNCHRONIZER FOR TRANSMISSION

BACKGROUND OF THE INVENTION

The present invention relates to a transmission for a vehicle and, more particularly, to a synchronizer to be used in a manual transmission.

Here will be described a fundamental structure of a synchronizer to be used in a manual transmission for a vehicle. FIG. 7 shows a single cone type synchronizer, as disclosed in JPU No. 115221/1991. To a rotating shaft 1, there is splined a clutch hub 2. Across this clutch hub 2, there are rotatably arranged gears 3 and 4 to be synchronized. To the portions of these synchronized gears 3 and 4, as located at the side of the clutch hub 2, there are splined spline pieces 5 and 6. These spline pieces 5 and 6 are extended toward the clutch hub 2 to form boss portions. These boss portions are formed on their outer circumferences with taper cone portions 7 and 8, which are so fitted synchronizer rings 9 and 10 that they can move in the axial directions by a predetermined distance. Moreover, the clutch hub 2 has its outer circumference engaged by a hub sleeve 11 which is allowed to move only in the axial directions. This hub sleeve 11 has its inner circumference chamfered at its two end portions, and each of the synchronizer rings 9 and 10 also as its outer circumference chamfered. Moreover, each of the spline pieces 8 and 6 has its outer circumference splined to engage with the hub sleeve 11.

In the synchronizer thus constructed, as the hub sleeve 11 is moved toward one of the synchronized gears 3 and 4, the synchronizer rings 9 and 10 are accordingly moved toward the spline pieces 5 and 6 by the actions of (not-shown) keys. As a result, the synchronizer rings 9 and 10 are brought into engagement with the spline pieces 5 and 6 by the taper cone portions 7 and 8 so that they are synchronized to rotate. After the chamfers of the hub sleeve 11 and the chamfers of the synchronizer rings 9 and 10 have come into contact, the hub sleeve 11 is further moved. Then, the hub sleeve 11 advances while riding over the chamfers of the synchronizer rings 9 and 10 until it comes into engagement with the splines of the spline pieces 5 and 6.

The synchronizer rings 9 and 10 in the synchronizer acts to bring the hub sleeve 11 into engagement with the spline pieces 5 and 6 at the sides of the synchronized gears 8 and 4. Either in a neutral state, as shown in FIG. 7, or in the state in which a predetermined gear state is set by the not-shown gears, the synchronizer rings 9 and 10 are rotating together with the clutch hub 2. In case, however, no force is active to move the synchronizer rings 9 and 10 toward the clutch hub 2, the synchronizer rings 9 and 10 may come into engagement with the spline pieces 5 and 6 through the taper cone portions 7 and 8. In this state, the synchronizer rings 9 and 10 are rotating with the clutch hub 2, whereas the spline pieces 5 and 6 are rotating at a different velocity together with the synchronized gears 8 and 4. A slip is caused at the taper cone portions 7 and 8 to establish a sliding friction. This friction establishes a drag torque to cause a power loss and a temperature rise in the lubricating oil thereby to shorten the lifetime of the synchronizer rings. Due to a stick slip at the contacting time, moreover, the synchronizer rings bounce to make a noise (i.e., the so-called "chatter").

In the synchronizer of the prior art shown in FIG. 7, therefore, that portion of the clutch hub 2, which engages with the hub sleeve 11, is formed on its back face, i.e., inner circumference with taper surfaces 12 and 13 which have their radii gradually increased from the two end portions to the central portion, as taken in the axial direction. On the other hand, the synchronizer rings 9 and 10 are formed with radial holes 14 and 15. In these holes 14 and 18, there are movably received balls 16 and 17 acting as inertial masses. These balls 16 and 17 are carried radially outward by the centrifugal force.

In the synchronizer rings 9 and 10, as located at the sides of the spline pieces 5 and 6 so that they are not engaged by the hub sleeve 11, therefore, the balls 16 and 17 are carried radially outward by the centrifugal force to move toward the axial center along the taper surfaces 12 and 1S of the clutch hub 2. As a result, the synchronizer rings 9 and 10 are urged away from the spline pieces 5 and 6 so that the slip is eliminated at the taper cone portions 7 and 8.

In the synchronizer of the prior art described above, the centrifugal force to act upon the balls 16 and 17 is converted into axial forces by the taper surfaces 12 and 13 so that the synchronizer rings 9 and 10 may be returned by the axial forces. Since, however, the synchronizer rings 9 and 10 holding the balls 16 and 17 are axially movable small parts, the balls 16 and 17 to be held thereby must be small-sized to have a small mass. Moreover, the taper angle of the taper surfaces 12 and 13 to be formed on the clutch hub 2 is difficult to take a large value because the strength of the clutch hub 2 has to be retained. This necessarily reduces the axial forces which can be generated on the basis of the centrifugal force.

As a result, the aforementioned synchronizer of the prior art finds it difficult to generate axial forces sufficient for returning the synchronizer rings 9 and 10. Especially the synchronizer having the elastic members for pushing the synchronizer rings toward the spline pieces so as to prevent the chatter is required to have the axial forces capable of overcoming the elastic forces of the elastic members, so that the aforementioned mechanism of the prior art can hardly be adopted in the synchronizer of this kind from the practical standpoint.

SUMMARY OF THE INVENTION

A main object of the present invention is to reduce the drag torque between a synchronizer ring and a rotating member to be synchronized.

Another object of the present invention is to increase a force axially acting to disengage the synchronizer ring from the synchronized rotating member on the basis of a centrifugal force.

In order to achieve the above-specified objects, the present invention is characterized in that the inertial mass to be influenced by the centrifugal force is held in the clutch hub to enlarge its size and in that a slope for generating an axial force on the basis of a centrifugal force is formed on a projection of the synchronizer ring to enlarge its angle of inclination.

According to the present invention, more specifically, there is provided a synchronizer for a transmission, in which a hub sleeve having a splined inner circumference is axially movably arranged on the outer circumference of a clutch hub mounted on a rotating member, in which keys are arranged between said clutch hub and said hub sleeve, in which a synchronized rotating member splined to said hub sleeve as said hub sleeve is axially moved is arranged adjacent to said clutch hub and rotatably with respect to said rotating member, in which at least one synchronizer ring brought into frictional contact with said synchronized rotating member for transmitting a torque thereto is arranged between said synchronized rotating member and said clutch hub, and in which said synchronizer ring is formed in its outer circumference formed with a chamfer to be splined to said hub sleeve, comprising: an inertial mass so held by said clutch hub that it can be moved radially outward by a centrifugal force; a projection extending around the outer circumference of said inertial mass and united with said synchronizer ring; and a slope formed on said projection at a portion radially confronting said inertial mass for generating an axial force for pushing said synchronizer ring away from said synchronized rotating member on the basis of the centrifugal force of said inertial mass.

According to the present invention, therefore, the synchronizer ring is brought into frictional engagement with the synchronized rotating member so that the torque is transmitted inbetween. When the clutch hub is rotated, the inertial mass held by the clutch hub is influenced by the centrifugal force so that it is carried radially outward, in this case, the inertial mass comes into contact with the slope formed on the projection of the synchronizer, so that the axial force based upon the centrifugal force is generated so that the load acts to disengage the synchronizer from the synchronized rotating member. This axially acting force is determined by the centrifugal force to act upon the inertial mass and by the inclination angle of the slope. Since the inertial mass is held in the clutch hub having a sufficient sizing allowance, it can be made necessarily and sufficiently large. Since, moreover, the slope is formed on the projection united with the synchronizer ring, its inclination angle can be sufficiently large. As a result, the axially acting force obtained can be increased to disengage the synchronizer ring from the synchronized rotating member thereby to eliminate the friction inbetween and the drag torque to be caused by the friction.

If, on the other hand, an elastic member is provided for pushing the synchronizer ring toward the synchronized rotating member, the synchronizer ring is brought into contact with the synchronized rotating member when the centrifugal force is low. As a result, an urging force for rotating the synchronized rotating member in a predetermined direction is generated so that the called "chatter" is not made even in case the fluctuation of the rotating angular velocity is high. If the centrifugal force is high, on the contrary, the load is generated in the direction to disengage the synchronizer ring from the synchronized rotating member, as described above. Moreover, the axially acting force is so high that the synchronizer ring can be disengaged from the synchronized rotating member against the elastic force of the elastic member. As a result, it is possible to eliminate the drag torque between the synchronizer ring and the synchronized rotating member.

The above and further objects and novel feature of the present invention will more fully appear from the following detailed description when the same is read with reference to the accompanying drawings. It is to be expressly understood, however, that the drawings are for purpose of illustration only and not intended as a definition of the limits of the invention.

DETAILED DESCRIPTION OF THE PREFERRED EMBODIMENTS

Figure 1:
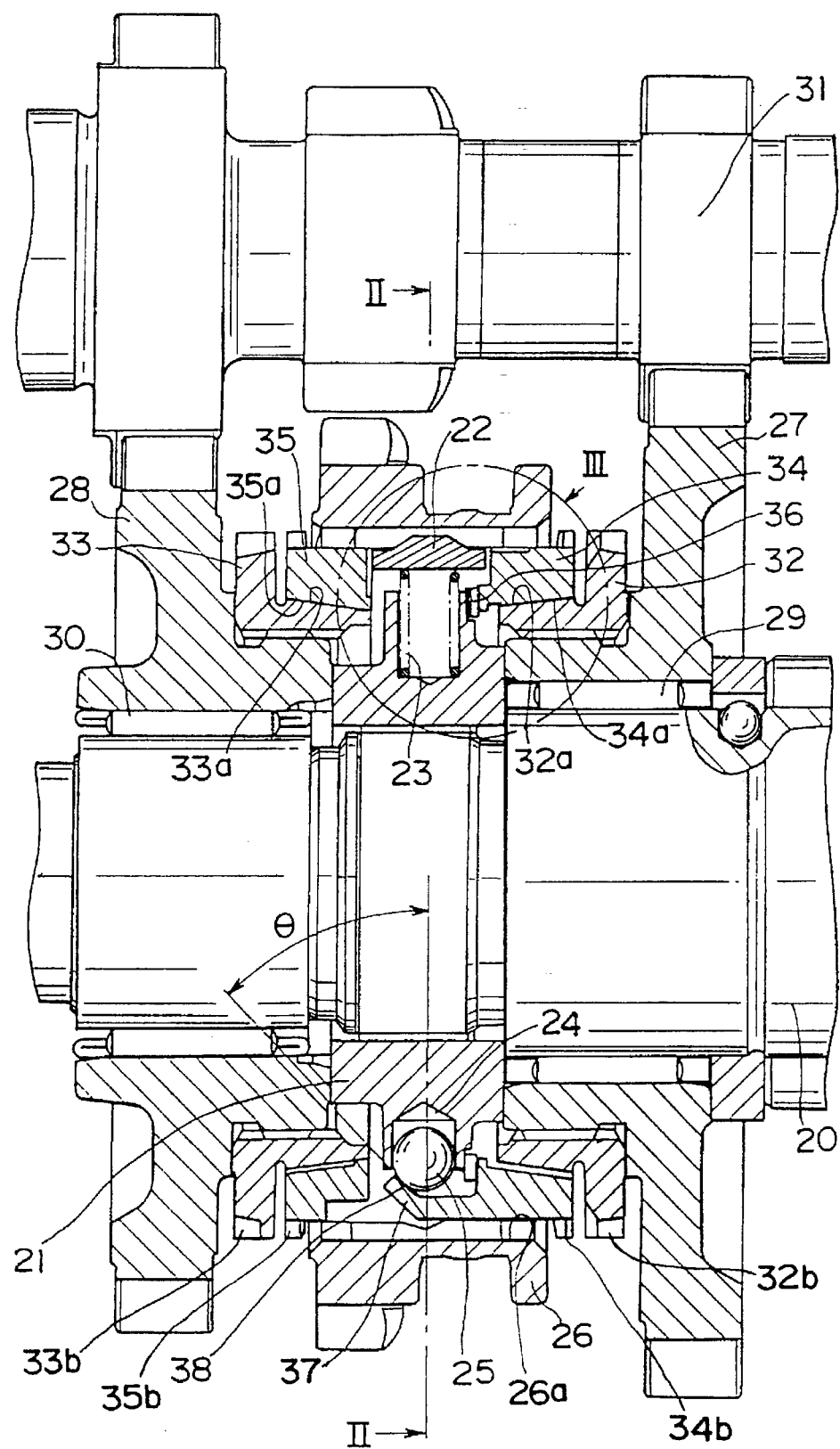
FIG. 1 is a section showing one embodiment of the present invention.
Figure 2:
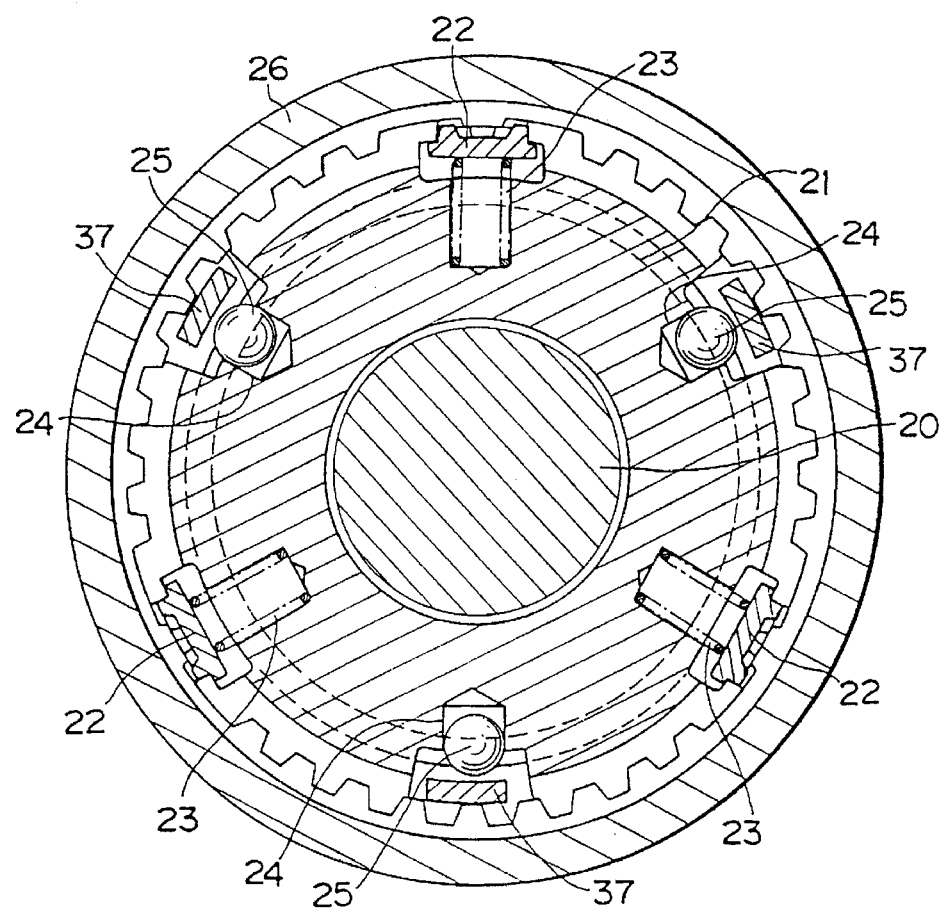
FIG. 2 is a section taken in the direction of arrows II—II of FIG. 1.
Figure 3:
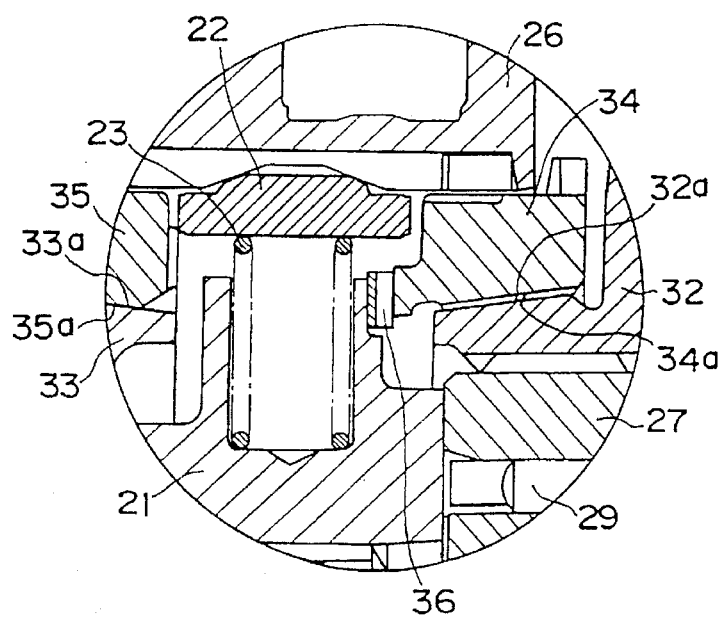
FIG. 3 is a section showing a portion III taken from FIG. 1.

The present invention will be described in detail in connection with its embodiments. FIGS. 1 to 3 are sections showing one embodiment of the present invention. In these Figures, a clutch hub 21 is splined on a shaft 20, which is stationary in a neutral state in which the transmission is transmitting no torque. In a plurality of (or three in the shown embodiment) portions of the outer circumference of the clutch hub 21, there are fitted keys 22 which are made slidable in the axial directions. These keys 22 are pushed radially outward by springs 23 which are arranged radially internally of the keys 22. Moreover, the clutch hub 21 is formed in a plurality of (or three in the shown embodiment) portions of its outer circumference with recesses 24, which radially extend and are opened in the outer circumference. In these recesses 24, there are so received steel balls 25 acting as inertial masses which can move outward and inward in the radial directions. To the outer circumference of the clutch hub 21, moreover, there is so splined a hub sleeve 26 as is allowed to move only in the axial directions.

At the two sides across the clutch hub 21, as taken in the axial direction, there are arranged gears 27 and 28 having different diameters. These gears 27 and 28 are rotatably fitted on the shaft 20 through bearings 29 and 30. Moreover, the gears 27 and 28 mesh with the gears which are formed in an input shaft The individual gears 27 and 28 are protruded toward the clutch hub 21 to form boss portions, to which are splined spline pieces 82 and 33. These spline pieces 82 and 33 are formed in their outer circumferences with the splines to mesh with the aforementioned hub sleeve 28. The individual boss portions are formed on their outer circumferences with taper surfaces which are radially reduced at the sides of the clutch hub 21. On these individual taper surfaces 82a and 33a, there are loosely fitted synchronizer rings 84 and 35.

These synchronizer rings 34 and 35 are formed on their inner circumferences with taper surfaces 84a and 35a which confront the taper surfaces 32a and 33a of the spline pieces 32 and 33. When the taper surfaces 32a and 33a of the spline pieces 32 and 33 and the taper surfaces 84a and 35a of the synchronizer rings 34 and 85 are brought into contact, the torque transmission is effected between the spline pieces 32 and 33 and the synchronizer rings 84 and 35. In short, here is formed the taper cone portion.

Figure 4:
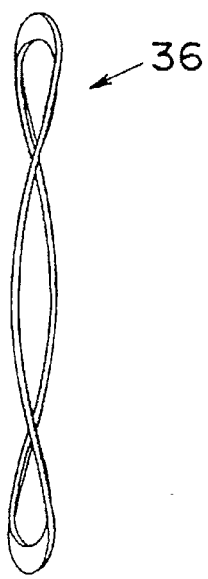
FIG. 4 is a side elevation of a wave spring.

Between the synchronizer ring 84, as located at the righthand side of FIG. 1, and the clutch hub 21, there is sandwiched an elastic member 88 for pushing the synchronizer ring 34 toward the spline piece 82. This elastic member 36 can be exemplified by a suitable spring such as a coil spring or a coned disc spring, and a wave spring shown in FIG. 4 is used in the shown embodiment. As a result, the synchronizer ring S4 is urged by the elastic force toward spline piece 82 so that they can be held in sliding contact to transmit the torque through the taper cone portion between them.

Moreover, the synchronizer ring S4 is formed, in its portion confronting the balls 25 as the aforementioned inertial masses, with plate-shaped projections 87 extending around the outer circumferences of the individual balls 25. Each of the projections 87 has its leading end portion folded radially inward to embrace that portion of the outer circumference of the corresponding ball 25, which is opposed to the wave spring 86, to form a slope 88 having an angle θ with respect to the radial direction. Specifically, this slope 88 generates a force for pushing the synchronizer ring 84 leftward of FIG. 1, that is, in the direction to compress the wave spring 86 to bring the synchronizer ring 84 apart from the spline piece 82, as the balls 25 are radially carried out of the recesses 24.

Incidentally, the means for transmitting the torque from the hub sleeve 26 to the spline pieces 32 and 33 is substantially similar to that of the prior art. Specifically, the hub sleeve 28 has its inner circumference formed with a spline 28a. On the other hand, the synchronizer rings 34 and 35 are formed on their outer circumferences with chamfers 34b and 33b to engage with the spline 26a of the hub sleeve 26. Moreover, the spline pieces 32 and 33 are formed in their outer circumferences with splines 32b and 33b to engage with the spline 26a of the hub sleeve 28.

In the synchronizer thus far described, the shaft 20 and the clutch hub 21 are not rotated but stopped at the neutral time when the hub sleeve 28 takes the state shown in FIG. 1. On the contrary, the gears 27 and 28 are rotated by the rotating input shaft 31. In this state, the synchronizer ring 34, as located at the righthand side of FIG. 1, is pushed toward the spline piece 32 by the wave spring 36, so that the synchronizer ring 34 and the spline piece 32 are held in contact in the taper cone portion to generate the frictional torque. In other words, the torque in the rotating direction of the gear 27 acts upon the synchronizer ring 34, the hub sleeve 26 and the clutch hub 21 so that the backlash in the rotating direction is eliminated to prevent the so-called "chatter".

When, on the other hand, the clutch hub 21 is rotated together with the shaft 20 while the vehicle is running, the centrifugal force acts upon the balls 25. This centrifugal force increases with the increase in rotation so that the balls 25 are radially carried out of the recesses 24. Then, the balls 25 come into the slopes 38 which are formed on the projections 37 of the synchronizer ring 34, so that the synchronizer ring 34 is accordingly subjected to the axial force for disengaging it from the spline piece 32.

The magnitude of the axial force is substantially determined by the inclination angle θ. In the construction shown in FIGS. 1 to 3, however, the slope 38 is formed on the projection 37 of the synchronizer ring 34 so that the angle θ of the slope 38 is not especially limited but can be set to a considerably large value. Thus, the axial force to act upon the synchronizer ring 34 can be a high load. As a result, at a predetermined or higher number of revolution, the synchronizer ring 34 can be completely disengaged from the spline piece 32 against the elastic force of the wave spring 36 so that the sliding contact between the spline piece 32 and the synchronizer ring 34 can be eliminated to prevent the so-called "drag torque" inbetween.

Figure 5:
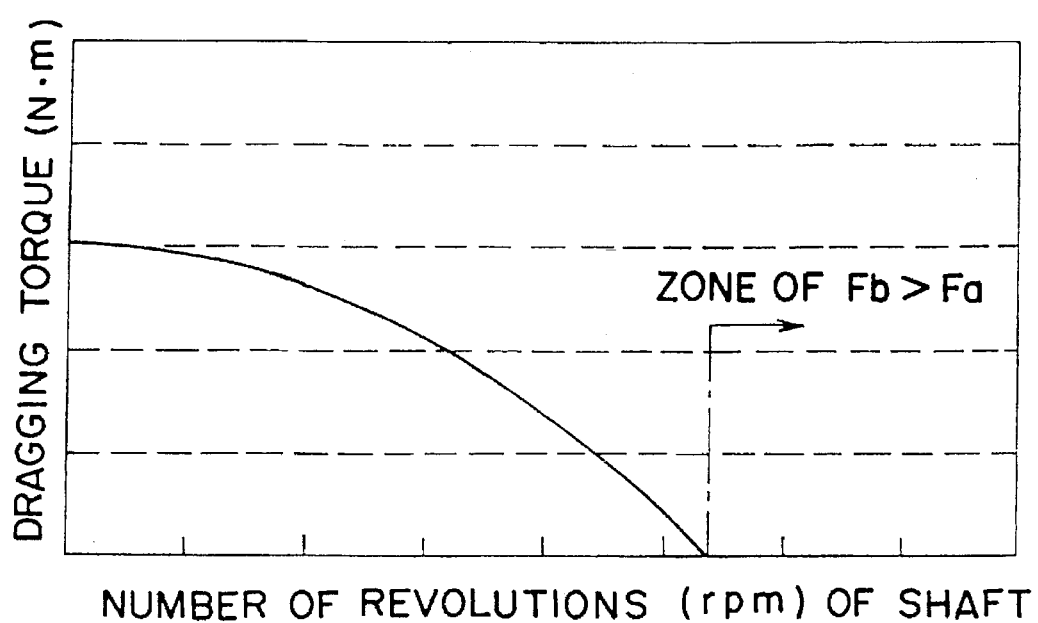
FIG. 5 is a diagram illustrating a relation between the number of revolution of a shaft and a drag torque.

Here, the relation between the revolution number of the shaft and the drag torque is illustrated in FIG. 5. When the revolution number of the shaft exceeds a predetermined rpm, an axial force $Fb$ to be established by the centrifugal force overcomes a resisting force $Fa$ to be established by the elastic force of the wave spring 36 or by the frictional force. As a result, the contact between the spline piece 32 and the synchronizer ring 34 in the taper cone portion is eliminated to reduce the drag torque to zero.

Incidentally, the synchronizing action to be taken by the synchronizer shown in FIG. 1 is substantially similar to that of the prior art. When the hub sleeve 26 is axially moved, the keys 22 are axially moved together with the hub sleeve 26 to push the synchronizer rings 34 and 35 in the axial directions. As a result, the taper surfaces 34a and 35a on the inner circumferences of the synchronizer rings 34 and 35 are brought into contact with the corresponding taper surfaces 32a and 38a of the spline pieces 32 and 88 so that the synchronizer rings 34 and 85 and the spline pieces 82 and 83 begin to synchronously rotate. Then, the spline 26a of the hub sleeve 26 and the chamfers 34b and 35b of the synchronizer rings 34 and 35 come into contact with each other so that the hub sleeve further moves in the axial direction. As a result, the hub sleeve 26 moves to the spline pieces 32 and 33 while pushing out the chamfers 34b and 35b of the synchronizer rings 34 and 35, until it comes into engagement with the splines 32b and 33b to complete a shift.

Figure 6:
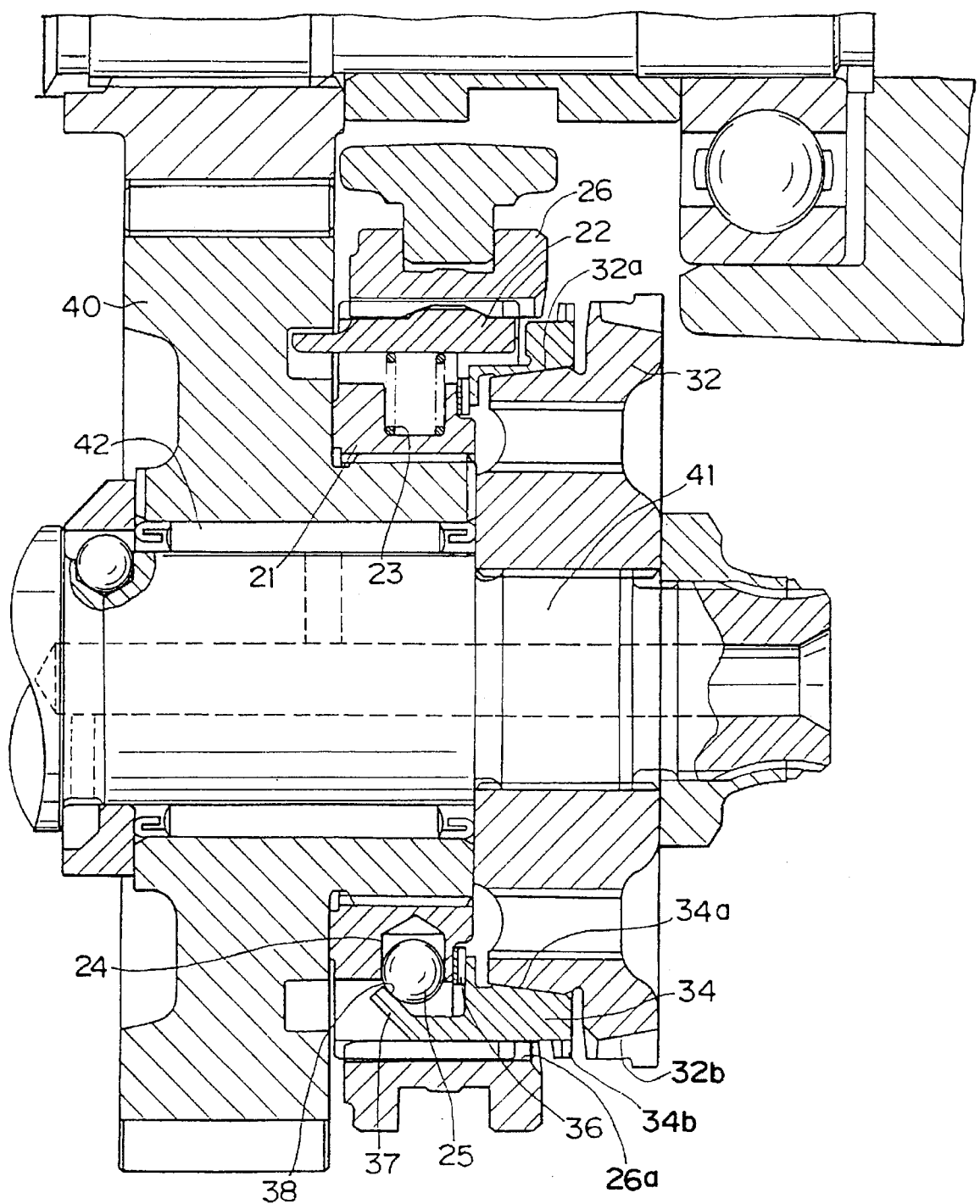
FIG. 6 is a section showing another embodiment of the present invention.

FIG. 6 shows another embodiment of the present invention. In the synchronizer, as shown, the clutch hub 21 is fixed on a gear 40 which is not rotated at the idling time, whereas the spline piece 32 is fixed on a counter shaft 41 which idly rotates the spline piece 32. Specifically, the gear 40 is rotatably mounted on the counter shaft 41 through a bearing 42, and the clutch hub 21 is splined on the outer circumference of the boss portion of the gear 40. The remaining construction is substantially similar to that of the embodiment shown in FIG. 1, and its description will be omitted by giving FIG. 6 the reference numerals identical to those of FIG. 1.

In the construction shown in FIG. 6, at the idling time, the counter shaft 41 is rotating, but the gear 40 and the clutch hub 21 are not rotating but at rest. However, the synchronizer ring 34 is pushed toward the spline piece 32 by the wave spring 36 so that the synchronizer ring 34 and the spline piece 32 come into sliding contact in the taper cone portion inbetween to transmit the torque. Moreover, the rotational load is exerted upon the synchronizer ring 34 and the clutch hub 21 so that the chatter is prevented even in the "neutral state".

If, on the contrary, the clutch hub 21 is rotated together with the gear 40 while the vehicle is running, the centrifugal force acts upon the balls 25. As a result, the axial force, as directed leftward of FIG. 6, is applied to the synchronizer ring S4 through the slopes 38 on the projections 37, so that the synchronizer ring 34 is disengaged from the spline piece 32 to eliminate the sliding contact inbetween. In other words, the drag torque between the synchronizer ring 34 and the spline piece 32 is prevented.

Figure 7:
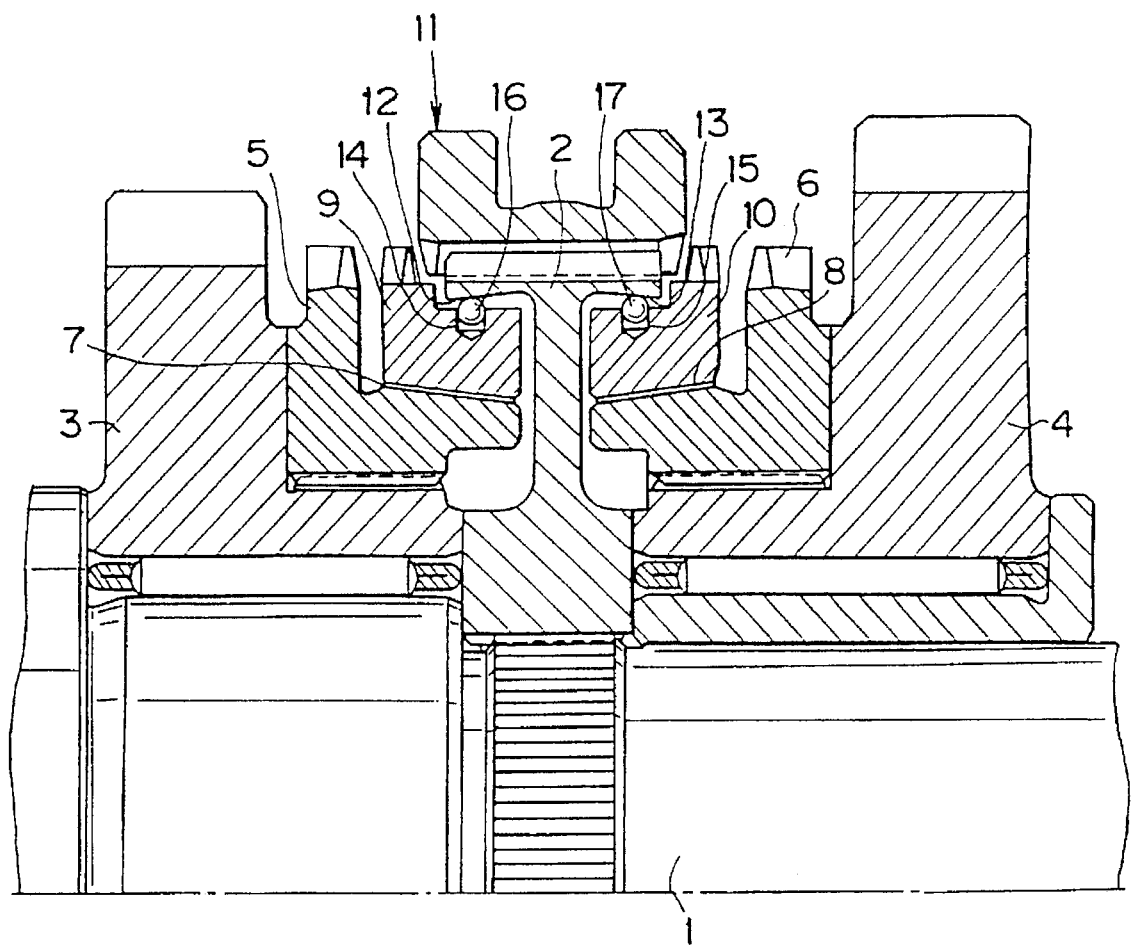
FIG. 7 is a section showing one example of the synchronizer of the prior art.

In the aforementioned individual embodiments, the balls 25 to be moved radially outward by the centrifugal force are held by the clutch hub 21 having a sufficient sizing allowance so that they can be made far larger than those of the synchronizer of the prior art shown in FIG. 7. Moreover, the slopes 38 for converting the radially outward load into the axially acting force are formed on the projections 37 of the synchronizer ring 34 so that their angle of inclination is not especially restricted but can be set to a large value.

Thus, the axial force can be increased not only because of the high centrifugal force by the balls but also because of the large inclination angle θ of the slopes 38. As a result, while the clutch hub 21 is rotating, the synchronizer ring 34 can be disengaged without fail from the spline piece 32 to eliminate the drag torque inbetween so that the power loss can be prevented to improve the fuel consumption rate.

Thanks to the high force in the axial direction, moreover, at the running time, the synchronizer ring 34 can be disengaged from the spline piece 32 against the elastic force of the elastic member such as the wave springs 36 used in the foregoing individual embodiments, even in case the synchronizer ring 84 is pushed toward the spline piece 32 by the elastic member so as to eliminate the chatter at the neutral or idling time. As a result, it is possible to prevent not only the chatter at the neutral or idling time but also the drag torque.

In the foregoing embodiments, the inertial mass is exemplified by the balls. However, the present invention should not be limited to the individual embodiments, but the inertial mass may be exemplified by any having an arbitrary shape such as pins or rods having rounded leading end faces. If these shapes are adopted, the inertial mass can be further increased.

In the foregoing individual embodiments, moreover, the present invention has been described by exemplifying the single cone type synchronizer. However, the present invention can also be applied to a double cone type synchronizer or a triple cone synchronizer. In case the present invention is applied to these multicone type synchronizers, a high power is lost due to the drag torque at the radially outer taper cone portions. It is, therefore, preferable that the axial force to be generated by the centrifugal force acting upon the inertial mass be exerted upon the radially outer synchronizer ring.

Here will be synthetically described the advantages to be achieved by the present invention. According to the synchronizer of the present invention, the inertial mass to be influenced by the centrifugal force is held in the clutch hub so that its size is hardly restricted. As a result, the inertial mass can be large-sized to generate a high centrifugal force. Since, moreover, the slopes for converting the load based upon the centrifugal force of the inertial mass into the axial force are formed on the projections which are united with the synchronizer ring, their inclination angle can be enlarged without any restriction. As a result, it is possible to increase the axial force for the load which is generated radially outward by the centrifugal force.

According to the present invention, therefore, it is possible not only to increase the centrifugal force itself but also to convert the same into the axial force. As a result, the synchronizer ring can be disengaged without fail from the synchronized rotating member such as a spline piece to thereby eliminate the drag torque inbetween. Especially even in case there is used the elastic member for pushing the synchronizer ring toward the synchronized rotating member so as to prevent the chatter, the synchronizer ring can be disengaged from the synchronized rotating member by the high axial force against the elastic force. As a result, it is possible to prevent the chatter at a low rpm and to effectively eliminate the drag torque at a high rpm.

What is claimed is:

1. A synchronizer for a transmission, in which a hub sleeve having a splined inner circumference is axially movably arranged on an outer circumference of a clutch hub mounted on a rotating member, in which keys are arranged between said clutch hub and said hub sleeve, in which a synchronized rotating member splined to said hub sleeve as said hub sleeve is axially moved is arranged adjacent to said clutch hub and rotatably with respect to said rotating member, in which at least one synchronizer ring brought into frictional contact with said synchronized rotating member for transmitting a torque thereto is arranged between said synchronized rotating member and said clutch hub, and in which said synchronizer ring is formed in its outer circumference with a chamfer to be splined to said hub sleeve, the synchronizer comprising:

an inertial mass held by said clutch hub so that the inertial mass can be moved only radially outward by a centrifugal force;

a projection extending around an outer circumference of said inertial mass and united with said synchronizer ring; and a slope formed on said projection at a portion radially confronting said inertial mass for generating an axial force for pushing said synchronizer ring away from said synchronized rotating member on a basis of the centrifugal force of said inertial mass.

2. A transmission synchronizer according to claim 1, wherein said projection has a leading end portion folded toward a radial center of said synchronizer ring and formed with said slope on an inner surface thereof.

3. A transmission synchronizer according to claim 1, wherein said clutch hub is formed in its outer circumference with a recess which extends radially of said clutch hub and is opened in the outer circumference of the clutch hub for accommodating said inertial mass.

4. A transmission synchronizer according to claim 1, wherein said inertial mass includes a steel ball.

5. A transmission synchronizer according to claim 1, wherein said inertial mass includes a plurality of balls arranged at an equal interval in a circumferential direction of said clutch hub.

6. A transmission synchronizer according to claim 5, wherein said inertial mass includes three steel balls arranged at an equal interval in the circumferential direction of said clutch hub.

7. A transmission synchronizer according to claim 5, wherein said projection includes a plurality of rectangular plate portions formed at an equal interval in the circumferential direction of said clutch hub.

8. A transmission synchronizer according to claim 7, wherein said projection includes three rectangular plate portions formed at an equal interval in the circumferential direction of said clutch hub.

9. A transmission synchronizer according to claim 1, further comprising an elastic member arranged between said clutch hub and said synchronizer ring for pushing said synchronizer ring toward said synchronized rotating member.

10. A transmission synchronizer according to claim 9, wherein said elastic member includes a ring-shaped wave spring.

11. A transmission synchronizer according to claim 1, wherein said synchronized rotating member includes: a gear fitted on said rotating member; and a spline piece splined on a boss portion of said gear and formed with said chamfer in its outer circumference.

* * * * *